United States Patent
Tamaoki et al.

(10) Patent No.: US 7,698,856 B2
(45) Date of Patent: *Apr. 20, 2010

(54) GLASS RUN FOR AUTOMOBILE

(75) Inventors: Kiyotaka Tamaoki, Aichi-ken (JP); Hakurei Watanabe, Wako (JP); Jiro Yamaguchi, Wako (JP)

(73) Assignees: Toyoda Gosei Co., Ltd., Aichi-pref. (JP); Honda Motor Co., Ltd., Tokyo (JP)

( * ) Notice: Subject to any disclaimer, the term of this patent is extended or adjusted under 35 U.S.C. 154(b) by 463 days.

This patent is subject to a terminal disclaimer.

(21) Appl. No.: 11/392,967

(22) Filed: Mar. 30, 2006

(65) Prior Publication Data

US 2006/0248802 A1  Nov. 9, 2006

(30) Foreign Application Priority Data

Mar. 31, 2005  (JP)  .................. P-2005-100710

(51) Int. Cl.
  *E05F 3/00* (2006.01)
(52) U.S. Cl. .................. 49/441; 49/489.1; 49/495.1
(58) Field of Classification Search .................. 49/440, 49/441, 495.1, 489.1, 475.1
  See application file for complete search history.

(56) References Cited

U.S. PATENT DOCUMENTS

| | | | | |
|---|---|---|---|---|
| 3,131,439 A | * | 5/1964 | Wilfert | .................. 49/416 |
| 4,947,586 A | * | 8/1990 | Mesnel et al. | .............. 49/490.1 |
| 6,301,834 B1 | * | 10/2001 | Tyves | .................. 49/441 |
| 6,493,992 B2 | | 12/2002 | Goto | |
| 6,499,257 B1 | * | 12/2002 | Tsuchida et al. | ............ 49/495.1 |
| 7,316,097 B2 | * | 1/2008 | Shiraiwa et al. | ................ 49/441 |

(Continued)

FOREIGN PATENT DOCUMENTS

JP    A-60-213524    10/1985

(Continued)

OTHER PUBLICATIONS

First Office Action issued on Mar. 20, 2009 from the Chinese State Intellectual Property Office for the corresponding Chinese patent application No. 200610066846.0 (with English translation).

(Continued)

*Primary Examiner*—Jerry Redman
(74) *Attorney, Agent, or Firm*—Posz Law Group, PLC (57) ABSTRACT

A glass run mounted along an inner part of a door frame of a vehicle door to guide a window glass which moves up and down within the door frame. A main body portion of the glass run is provided with an exterior side wall, an interior side wall and a bottom wall, thereby formed into a shape having a substantially U-shaped cross section. An exterior seal lip and an interior seal lip are provided so as to extend into an inside of the substantially U-shaped cross section from distal portions of the exterior side wall and the interior side wall, respectively. The bottom wall has a bottom wall damping lip which is formed so as to be inclined inwardly from one of side end portions of an inner surface of the bottom wall. A space which is provided between an outer surface of the bottom wall portion and a door frame. A cushion material is provided in the space.

7 Claims, 3 Drawing Sheets

U.S. PATENT DOCUMENTS

| | | | |
|---|---|---|---|
| 7,383,662 B2 * | 6/2008 | Tamaoki | 49/441 |
| 2004/0237412 A1 | 12/2004 | Aritake et al. | |
| 2005/0095397 A1 | 5/2005 | Omori et al. | |
| 2005/0120633 A1 * | 6/2005 | Takase et al. | 49/441 |
| 2006/0064936 A1 * | 3/2006 | Shiraiwa et al. | 49/441 |
| 2006/0248802 A1 * | 11/2006 | Tamaoki et al. | 49/441 |

FOREIGN PATENT DOCUMENTS

| | | |
|---|---|---|
| JP | UM-A-62-413 | 1/1987 |
| JP | U-3-000222 | 1/1991 |
| JP | 06135240 A * | 5/1994 |
| JP | UM-A-06-053243 | 7/1994 |
| JP | A-08-318740 | 12/1996 |
| JP | A-9-020149 | 1/1997 |
| JP | A-10-226238 | 8/1998 |
| JP | A-2000-85373 | 3/2000 |
| JP | A-2001-206070 | 7/2001 |
| JP | A-2002-187432 | 7/2002 |
| JP | A-2003-252064 | 9/2003 |
| JP | A-2004-090846 | 3/2004 |
| JP | A-2004-106825 | 4/2004 |

OTHER PUBLICATIONS

Japanese Office Action issued on Sep. 9, 2009 for the corresponding Japanese patent application No. 2005-100710 (English translation thereof).

* cited by examiner

GLASS RUN FOR AUTOMOBILE

BACKGROUND OF THE INVENTION

1. Field of the Invention

The present invention relates to a glass run for automobile which is mounted along an inner part of a door frame of a vehicle door to guide a window glass which moves up and down within the door frame.

2. Related Art

Figure 3:
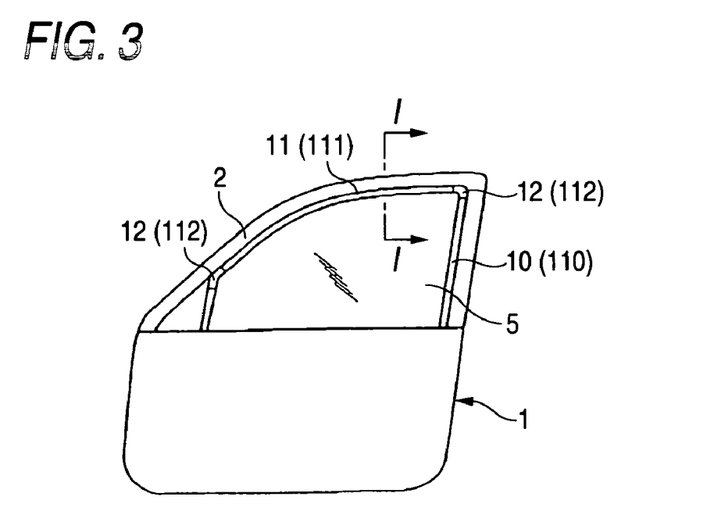
FIG. 3 is a side view of a vehicle door.

As shown in FIG. 3, a glass run 110 for an automobile is mounted along an inner part of a door frame 2 of a vehicle door to guide a window glass 5 which moves up and down within the door frame 2. A conventional mounting structure of the glass run is shown in FIGS. 4 and 5.

Figure 4:
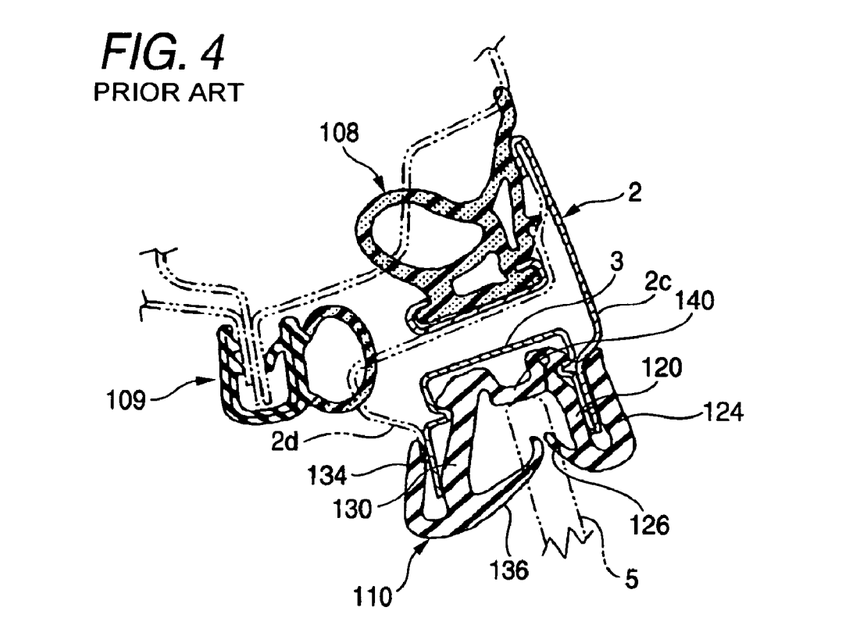
FIG. 4 is a sectional view taken along the line I-I in FIG. 3 which shows a conventional glass run mounted in a door frame.
Figure 5:
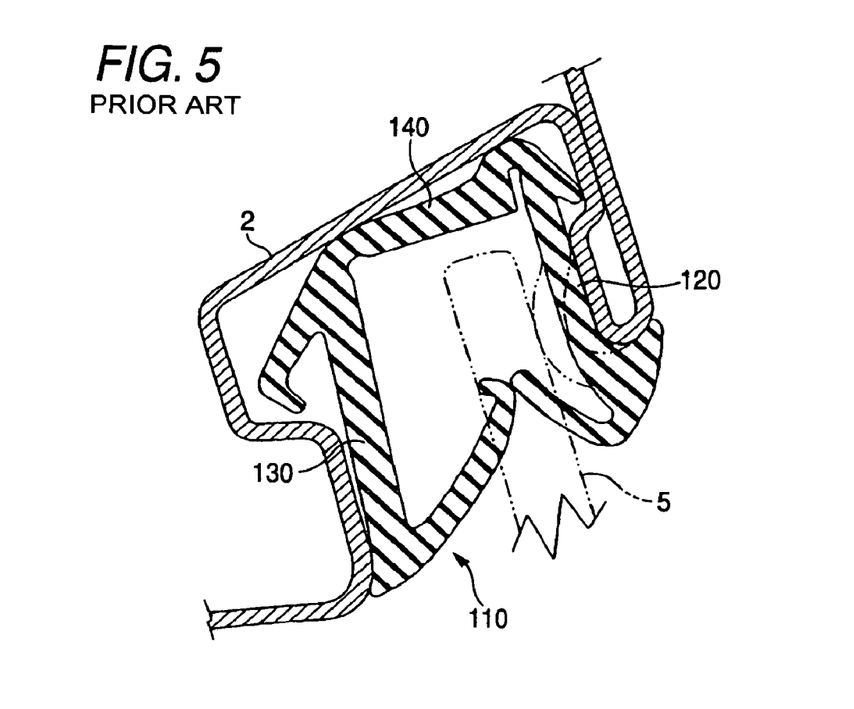
FIG. 5 is a sectional view of another conventional glass run.

FIG. 4 is a sectional view taken along the line I-I in FIG. 3.

Conventionally, the glass run 110 is, as shown in FIG. 4, mounted in a channel 3 of the door frame 2 to guide the window glass 5 which moves up and down within the door frame 2 and to form a seal between the window glass 5 and the door frame 2. Furthermore, in the glass run 110, a top side portion, a front vertical side portion and a rear vertical side portion, which correspond to sections of the door frame 2 of the door 1, respectively, and which are provided with extruded portions 111 formed by extrusion molding, are connected together by corner portions 112 which are molded by injection molding in shape to connect the extruded portions so as to follow the shape of the door frame 2.

In addition, a seal between the door 1 and a vehicle body is made by a door weather strip 108 which is mounted along an outer periphery of the door frame 2 of the door 1 and/or an opening weather strip 109 which is mounted on a flange at a corresponding opening in the vehicle body.

The glass run 110 is, as shown in FIG. 4, provided with an exterior side wall 120, an interior side wall 130 and a bottom wall 140 which form a substantially U-shaped cross section. An exterior seal lip 126 is provided on the exterior side wall 120 so as to extend from the vicinity of a distal portion thereof into an inside of the substantially U-shaped cross section. In addition, an interior seal lip 136 is provided on the interior side wall 130 so as to extend from the vicinity of a distal portion thereof into an inside of the substantially U-shaped cross section. Furthermore, an external cover lip 124 is provided on the exterior side wall 120 so as to extend from the vicinity of a distal portion of an external outer surface thereof toward the bottom wall 140 along the exterior side wall 120. An internal cover lip 134 is provided on the interior side wall 130 so as to extend from the vicinity of a distal portion of an internal outer surface thereof toward the bottom wall 140 along the interior side wall 130.

The exterior side wall 120, the interior side wall 130 and the bottom wall 140 are inserted in the channel 3 provided in the door frame 2, and outer surfaces of the respective walls are brought into contact with an inner surface of the channel 3. A distal end portion of an outer panel 2c of the door frame 2 is inserted between the exterior side wall 120 and the external cover lip 124. A distal end of an inner panel 2d is inserted between the interior side wall 130 and the internal cover lip 134, whereby the glass run 110 is held.

The window glass 5 moves inside the substantially U-shaped cross section of the glass run 110 and is sealed and held on both sides thereof at positions which correspond to distal portions of the glass run 110 by the exterior seal lip 126 and the interior seal lip 136, respectively.

When the window glass 5 is closed, the window glass 5 of a powered window moves up within the door frame 2. An upper end of the window glass 5 is inserted in the top side portion of the glass run 110 mounted on a top side section of the door frame 2 to thereby be brought into contact with the bottom wall 140. As this occurs, since the elevating motion of the window glass 5 cannot be controlled completely, the upper end of the window glass 5 comes to hit the bottom wall 140 and the channel 3 to thereby produce impact noise, which damages the comfortableness. In addition, the deformation of the bottom wall 140 when hit by the upper end of the window glass 5 is not stabilized, whereby the upper end of the window glass 5 deviates within the glass run 110 and the seal lips 126, 136 are deformed, sometimes leading to a drawback that the sealing property is deteriorated.

Due to this, in order to absorb the impact, a hollow portion is provided in the bottom wall 140 or a sponge sheet is mounted thereon (refer to, for example, JP-A-60-213524 and JP-UM-A-62-413). However, while an extrusion molding with blowing is necessary to provide the hollow portion in the bottom wall 140, in the event that the hollow portion is formed at the same time as the extrusion molding with blowing is carried out, it is difficult to hold the shape of the hollow portion, and this triggers difficulty in increasing the extruding speed, leading to a bad productivity. In addition, in the event that the sponge sheet is mounted, only a simple mounting of the sponge sheet on a back side of the bottom wall 140 cannot suffice a necessary thickness to provide a sufficient impact absorbing capability, and in case the sponge sheet having such a sufficient thickness is used, the stability of the bottom wall 140 relative to the door frame 2 is not sufficient.

In addition, while some countermeasures is tried in which a lip is provided at an inside portion of the glass run 110 which lies in the vicinity of the bottom wall 140 so that the upper end of the window glass 5 is made to come into forcible contact with the lip so as to absorb impact (refer to, for example, JP-A-2002-187432). In this event, however, the lip is caused to deform permanently after a long-time service, leading to a risk that the impact absorbing effect is deteriorated.

Furthermore, as shown in FIG. 5, there is proposed a configuration in which the thickness of the bottom wall 140 of the glass run 110 is gradually increased from the interior side wall 130 side to the exterior side wall 120 side so as to facilitate the deformation of the bottom wall 140 to absorb impact upon the collision of the upper end of the window glass 5 against the bottom wall 140 (refer to, for example, Japanese Utility Model Registration No. 2578541).

However, only the deformation of the bottom wall 140 cannot absorb the impact sufficiently. In addition, it was difficult to provide a sufficient space between the door frame 2 and the bottom wall 140 and hence, the impact absorbing capability provided thereby was not sufficient.

SUMMARY OF THE INVENTION

Due to this, the invention needs to prevent the production of foreign noise by absorbing impact of the window glass against the glass run when the window glass is closed.

(1) With a view to solving the problem, according to a first aspect of the invention, there is provided a glass run adapted to be mounted in an inner part of a door frame of a vehicle door to guide a window glass when the window glass moves up and down, the glass run comprising:

an exterior side wall, an interior side wall and a bottom wall so as to form substantially a U-shaped cross section; and an exterior seal lip and an interior seal lip that are provided at distal portions of the exterior side wall and the interior side wall respectively, extending toward an inside of the U-shaped cross section, so that the exterior seal lip and the interior seal lip seal an exterior surface and an interior surface of an end portion of the door window glass respectively, wherein the bottom wall is mounted to the door frame such that a back face of the bottom wall is inclined to an inner surface of the door frame, and a cushion material is provided in a space defined by the inclined back face of the bottom wall and the inner surface of the door frame, whereby a part of the back face of the bottom wall and a part of the cushion material are brought into contact with the inner surface of the door frame.

According to the first aspect of the invention, the distal end of the window glass can be accommodated inside the glass run which is provided with the exterior side wall, the interior side wall and the bottom wall to thereby be formed into the shape having the substantially U-shaped cross section, when the window is closed, so that the window glass can be held in a reliable manner. Since the window glass is sealed on both the external and internal surfaces at the end portion of the window glass by the exterior seal lip and the interior seal lip, the seal lips contact against the window glass in response to the movement of the window glass, whereby a seal can be established between the door frame and the window glass by the exterior seal lip and the interior seal lip.

Since the bottom wall is mounted so as to be inclined to the inner surface of the door frame and the cushion material is provided on the back face of the bottom wall, a large space can be ensured between the bottom wall and the door frame, so that the thickness of the cushion material can be increased so as to increase, in turn, the impact absorbing capability.

Since one of the side ends of the back face of the bottom wall and the cushion material are mounted so as to be brought into contact with the door frame, when the upper end of the window glass is brought into contact with the bottom wall. The upper end of the window glass is allowed to move until the other side end of the back face of the bottom wall comes into contact with the door frame while compressing the cushion material with the one side end of the back face of the bottom wall acting as a fulcrum, thereby making it possible to absorb impact produced as a result of the collision of the window glass against the bottom wall. In addition, since the one side end of the back face of the bottom wall and the cushion material are in contact with the door frame, there is no risk that the glass run deviates within the door frame when the glass run is hit by the window glass.

(2) According to a second aspect of the invention, the bottom wall is configured so that an interior side end of the bottom wall which is continuous to the interior side wall is brought into contact with the inner surface of the door frame and an exterior side end of the bottom wall which is continuous to the exterior side wall is apart from the inner surface of the door frame in a state that the glass run is mounted in the door frame.

When a distal edge of the window glass is brought into pressure contact with the bottom wall, the exterior side end of the bottom wall is brought into contact with the door frame.

According to the second aspect of the invention, the bottom wall is mounted so as to be brought into contact with the door frame along the side end thereof which is continuous to the interior side wall while being spaced apart from the door frame along the other side end which is continuous to the exterior side wall. When the upper end of the window glass is brought into pressure contact with the bottom wall, the side end of the bottom wall which is continuous to the exterior side wall is brought into contact with the door frame. Due to this, since the window glass is displaced toward the outside of the vehicle when the window glass moves up with the upper end thereof pressing against the bottom wall, a difference in level between the door frame and the window glass can be reduced, thereby making it possible to reduce air resistance and wind noise.

(3) According to a third aspect of the invention, an inner surface of the bottom wall is oriented substantially perpendicular to a direction in which the window glass moves up and down in a state the bottom wall is mounted in the door frame.

The interior seal lip is formed longer than the exterior seal lip.

When the window glass is brought into pressure contact with the bottom wall, an exterior side end of the bottom wall which is continuous to the exterior side wall is formed so as to be brought into contact with the door frame.

According to the third aspect of the invention, when the window glass moves up, and the upper end of the window glass presses against the central portion of the bottom wall, the bottom wall is inclined outwardly upwardly along the inclination of the door frame, and hence, the upper end of the window glass is displaced outwardly along the inclined surface, so that the exterior seal lip of the glass run and the window glass can be brought into tight contact with each other. In addition, the exterior seal lip is brought into contact with the window glass in a reliable manner, thereby making it possible to enhance the sealing property between the window glass and the glass run. Furthermore, since the window glass is displaced outwardly, a difference in level between the window glass and the door frame can be reduced.

Further, since the interior seal lip is formed longer than the exterior seal lip, the interior seal lip has a larger extent of deflection than the exterior seal lip, and even in the event that the window glass is displaced outwardly, the distal end of the interior seal lip can follow the window glass, thereby making it possible to secure the seal property.

(4) According to a fourth aspect of the invention, the bottom wall has a central portion, and an exterior connection portion and an interior connection portion which are integrally formed with the central portion at opposite ends thereof, and an end of the exterior connection portion is curved so as to be continuous to a root portion of the exterior side wall.

When the upper end of the window glass is brought into pressure contact with the bottom wall, a bottom wall seal lip is formed on an external surface of the exterior connection portion so as to be brought into contact with the door frame.

According to the fourth aspect of the invention, since the bottom wall has the central portion, and the exterior connection portion and the interior connection portion which are integrally formed along both the longitudinal side ends of the central portion, in such a manner that the side ends of the central portion continue from side ends of the exterior connection portion and the interior connection portion, respectively. When the glass run is attempted to be mounted in the door frame, the exterior connection portion and the interior connection portion can be bent flexibly to facilitate the mounting of the glass run, and also when the upper end of the window glass presses against the bottom wall, the exterior connection portion and the interior connection portion are bent to absorb an impact imparted by the window glass.

Since the other side end of the exterior connection portion is curved so as to continue to the root portion of the exterior side wall, a space can be provided in an external portion between the bottom wall and the door frame, whereby the cushion material can be mounted thick, so that not only can the impact absorbing capability be enhanced but also the absorption of impact imparted by the window glass can be facilitated by virtue of deflection of the exterior connection portion which occurs when the upper end of the window glass presses against the bottom wall.

Since the bottom wall seal lip is made to be brought into contact with the door frame when the upper end of the window glass is brought into pressure contact with the bottom wall, when the bottom wall deflects upwardly, the bottom wall seal lip is made to deflect so as not only to absorb further the impact imparted by the window glass but also to enhance the sealing capability between the glass run and the door frame.

(5) According to a fifth aspect of the invention, the bottom wall has a central portion, and an exterior connection portion and an interior connection portion which are integrally formed with the central portion at opposite ends thereof, and a projection is formed on an inner surface of the interior connection portion of the bottom wall that is brought into contact with an inner surface of the interior side wall when the glass run is mounted in the door frame.

According to the fifth aspect of the invention, when the glass run is mounted in the door frame, the interior side wall can be prevented from falling down inwardly, and when the upper end of the window glass enters the inside of the glass run and slides on a surface of the interior seal lip to thereby pull the interior side wall inwardly, the interior side wall can be prevented from falling down.

(6) According to a sixth aspect of the invention, a sub-lip is provided on an inner surface of the interior side wall.

According to the sixth aspect of the invention, since the sub-lip is provided on the inner surface of the interior side wall, when the distal end of the window glass enters the inside of the glass run and slides on the surface of the interior seal lip to push the interior side wall toward the interior side wall, a distal end of the interior seal lip can be pushed toward the window glass, whereby, even in the event that the interior seal lip is formed long. The interior seal lip is prevented from being brought into tight contact with the interior side wall, thereby making it possible not only to secure a pressing force against the window glass but also to secure the seal property.

Since the bottom wall is mounted so as to be inclined to the inner surface of the door frame and the cushion material is provided on the back face of the bottom wall, the large space can be provided between the bottom wall and the door frame and the cushion material can be formed thick, so as to increase the impact absorbing capability.

Since the one side end of the back face of the bottom wall and the cushion material are mounted so as to be brought into contact with the door frame, the distal end of the window glass is allowed to move until the other side end of the back face of the bottom wall comes into contact with the door frame while compressing the cushion material with the one side end of the back face of the bottom wall acting as a fulcrum, thereby making it possible to absorb impact produced as a result of the collision of the window glass against the bottom wall. There is eliminated a risk that the glass run deviates within the door frame when the glass run is hit by the window glass.

(7) According to a seventh aspect of the invention, the cushion material may be preferably adhered to an external surface of the bottom wall.

(8) According to a eighth aspect of the invention, the cushion material may be preferably formed of a sponge material.

DETAILED DESCRIPTION OF THE PREFERRED EMBODIMENTS

An embodiment of the invention will be described based on FIGS. 1 to 3.

FIG. 3 is a side view of a vehicle door 1. FIG. 1 is a sectional view taken along the line I-I in FIG. 3, which shows a state in which a glass run 10 is mounted in a door frame 2 without a window glass 5 inserted hereinto. FIG. 2 is a sectional view which shows a state in which an upper end of the window glass 5 is inserted in an inside of the glass run 10.

As shown in FIG. 3, the door frame 2 is provided at a top side section of the vehicle door 1 than a belt line thereof, and the window glass 5 is mounted therein so as to freely ascend and descend. Namely, the glass run 10 is mounted along an inner part of the door frame 2 so as not only to guide the window glass 5 which so moves up and down but also to form a seal between the window glass 5 and the door frame 2.

The glass run 10 is generally provided with substantially extruded portions 11 and corner portions 12 which are mounted at corner portions of the door frame 2 and are molded to connect the extruded portions 11 together.

The extruded portions 11 are a portion that is mounted on the top side section of the door frame 2, a portion that is mounted on a rear vertical side of the door frame 2 and a portion that is mounted on a front vertical side of the door frame 2. A part of the door frame 2 where the extruded portions 11 are mounted is formed into a shape having a substantially U-shaped cross section by bending distal ends thereof. Instead of forming the portion of the door frame 2 where the glass run 10 is mounted into the shape having the substantially U-shaped cross section by bending the relevant portions, a channel having a substantially U-shaped cross section may be separately formed to be mounted on the door frame 2.

The extruded portions 11, the portion mounted on the top side section of the door frame 2 and the portions mounted on the vertical sides thereof, of the glass run 10 basically have a substantially similar U-shaped cross section.

The invention mainly relates to the glass run 10 that is mounted on the top side section of the door frame 2.

The corner portions 12 of the glass run 10 are molded to connect the extruded portions 11 together at corner portions of the door frame 2 so as to form a shape which corresponds to that of the door frame 2 and at the same time, are molded to have a substantially similar cross section to that of the extruded portions 11 which are connected by the corner portions 12. Thus, the corner portions 12 are such as to be mounted at the corner sections 2b of the door frame 2.

Figure 1:
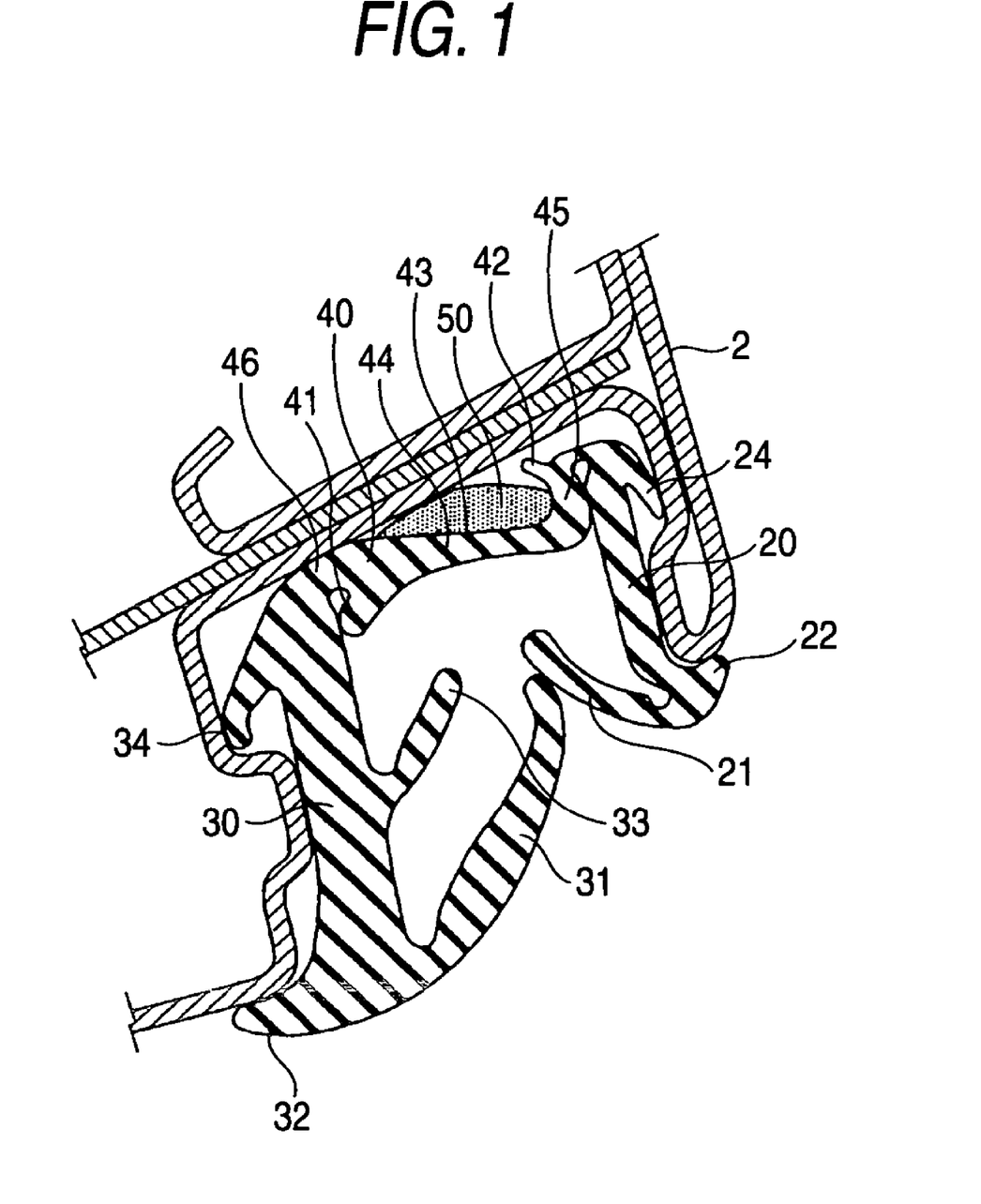
FIG. 1 is a partial sectional view taken along the line I-I in FIG. 3 which shows a state resulting before an upper end of a window glass is inserted into a glass run according to an embodiment of the invention.
Figure 2:
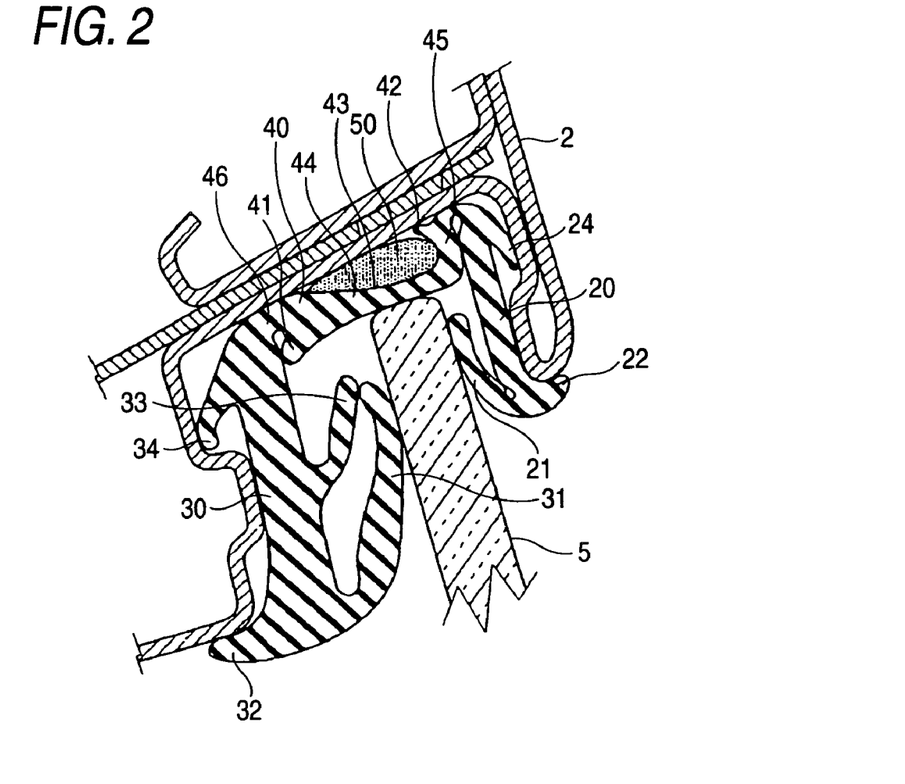
FIG. 2 is a partial sectional view taken along the line I-I in FIG. 3 which shows a state resulting after the upper end of the window glass is inserted into the glass run according to the embodiment of the invention.

The shape of cross section of the extruded portion 11 of the glass run 10 that is mounted on the top side section of the door frame 2 is, as shown in FIG. 1, formed into substantially a U-shape by an exterior side wall 20, an inside side wall 30 and a bottom wall 40.

An exterior seal lip 21 is provided on the exterior side wall 20 so as to extend from the vicinity of a distal portion thereof toward an inside of the substantially U-shaped cross section. In addition, an external cover lip 22 is provided so as to extend from an outer surface of the distal portion of the exterior side wall 20 so as to cover an exterior side of a distal end of the door frame 2. Additionally, an interior seal lip 31 is provided on the interior side wall 30 so as to extend from a distal portion thereof into the inside of the substantially U-shaped cross section, and an internal cover lip 32 is provided so as to extend from an outer surface of the distal portion of the interior side wall 30 toward an internal surface of the door frame 2 so as to cover an internal bent portion of the door frame 2.

The glass run 10 is formed such that distal ends of the exterior seal lip 21 and the interior seal lip 31 are brought into contact with each other when mounted in the door frame 2.

When the window glass 5 moves up to be inserted into an inside of the glass run 10, the distal ends of the exterior seal lip 21 and the interior seal lip 31 are brought into contact with a distal end of the window glass 5 so as to form a seal between the window glass 5 and the door frame 2.

An external holding lip 24 is provided on an outer surface of a root portion of the exterior side wall 20 which is close to a bottom wall exterior connection portion 45, which will be described later on. This external holding lip 24 is engaged at a stepped portion provided on an exterior side wall of a bent portion, which is bent so as to have a substantially U-shaped cross section, of the door frame 2 where the glass run 10 is to be mounted, so as not only to prevent the dislodgement of the glass run 10 from the door frame 2 but also to form a seal between an inner surface of the exterior side wall of the door frame 2 and the exterior side wall 20 of the glass run 10.

The exterior side wall 20 and the exterior seal lip 21 are formed smaller than the interior side wall 30 and the interior seal lip 31, respectively, and the exterior seal lip 21 is formed thinner than the interior seal lip 31. Due to this, the window glass 5 can be positioned further outwards within the glass run 10, thereby making it possible to reduce a difference in level between the window glass 5 and the door frame 2. Consequently, air resistance and wind noise are reduced, and it is preferable from the viewpoint of external design.

Similar to the exterior side wall 20, an internal holding lip 34 is provided on the interior side wall 30 so as to extend from an outer surface which is close to a bottom wall interior connection portion 46, which will be described later on. When the interior side wall 30 of the glass run 10 is mounted on an interior side wall of the door frame 2, since the interior side wall of the door frame 2 has a stepped portion, the internal holding lip 34 is engaged at the stepped portion, thereby making it possible to prevent the dislodgement of the interior side wall 30 of the glass run 10 from the door frame 2. In addition, the internal holding lip 34 is brought into contact with the door frame 2 so as not only to hold the glass run 10 but also to form a seal between the interior side wall of the door frame 2 and the exterior side wall 20 of the glass run 10.

The interior seal lip 31 is provided on the interior side wall 30 so as to extend from the distal portion thereof toward the inside of the substantially U-shaped cross section. An internal sub-lip 33 is provided at a substantially central portion on an inner surface of the interior side wall 30 so as to extend obliquely along to the interior seal lip 31, As shown in FIG. 2, when the window glass 5 enters the inside of the glass run 10, whereby the interior seal lip 31 is caused to deflect inwardly, a distal end of the interior seal lip 31 is brought into contact with the sub-lip 33, whereby an excessive bending of the interior seal lip 31 can be prevented. Due to this, when the distal end of the window glass 5 enters inside of the glass run 10, slides on a surface of the interior seal lip 31 to go deep into the inside of the glass run 10 and pushes the interior seal lip 31 toward the interior side wall 30, the internal sub-lip 33 can push the distal end of the interior seal lip 31 toward the window glass 5, whereby even in the event that the interior seal lip 31 is formed longer, a pressure to the window glass 5 can be secured, thereby making it possible to secure the seal property.

In addition, the interior seal lip 31 adheres to the interior side wall 30 in no case, thereby making it possible to prevent the production of foreign noise.

A low-degree slide assisting material such as urethane resin, silicone resin and the like is applied to surfaces of the exterior seal lip 21 and the interior seal lip 31 where the window glass 5 is brought into contact. Due to this, when the window glass 5 slides within the glass run 10, the sliding resistance can be reduced, thereby making it possible to prevent the production of foreign noise and the deviation of the glass run 10.

In addition, the low-degree slide assisting material such as urethane resin or the like may be affixed to an inner surface of the exterior side wall 20 and a back surface of the exterior seal lip 21. In this event, a tackiness of the exterior seal lip 21 to the exterior side wall 20 can be prevented.

Similar to the seal lips 21, 31, also at the bottom wall 40, the low-degree slide assisting material such as urethane resin or the like is applied to an inner surface of the substantially U-shaped cross section. Due to this, the sliding resistance of the window glass 5 can be reduced.

The bottom wall 40 of the glass run 10 is provided with a bottom central portion 44, which lies at a central portion thereof, and the bottom exterior connection portion 45 and the bottom interior connection portion 46 which are provided along both traverse side ends of the bottom central portion 44.

In cross section, the bottom central portion 44 is formed into a plate shape in which at the side of the interior side wall 30 the bottom central portion 44 is made to rise toward the side wall so as to form a bottom wall projection 41, which will be described later on, while the relevant portion is formed substantially flat from a position near a center toward the exterior side end thereof.

Due to this, when the window glass 5 moves up to be brought into contact with the bottom wall 40, the bottom wall 40 constitutes a slope which is inclined externally upwardly along the door frame 2, and the upper end of the window glass 5 slides along an inner surface of the bottom central portion 44 to thereby be displaced outwardly, whereby the exterior seal lip 21 of the glass run 10 can be brought into tight contact with the window glass 5, thereby making it possible to enhance the seal property between the window glass 5 and the glass run 10. In addition, a difference in level between the window glass 5 and the door frame 2 can be reduced.

One of side ends of the bottom exterior connection portion 45 which lies upper in FIG. 1 is formed so as to continue to the root portion of the exterior side wall 20, and the thickness of a portion which is continuous to the exterior side wall 20 is made thin. Due to this, when extruding the glass run 10, the glass run 10 is extruded with an opening of the substantially U-shaped cross section left open, and when mounted in the door frame 2, a thin bottom groove portion is easily bent to thereby form the substantially U-shaped cross section. Due to this reduced thickness, when the glass run 10 is mounted in the door frame 2, the exterior side wall 20 and the bottom wall exterior connection portion 45 are bent into a hairpin shape, and the bottom wall exterior connection portion 45 is brought into tight contact with the root portion of the exterior side wall therealong, as will be described later on. In addition, also when the upper end of the window glass 5 presses against the bottom wall 40, the bottom wall exterior connection portion 45 bends to thereby deflect the bottom portion 40, thereby making it possible to absorb impact produced by the window glass 5.

The door frame 2 is formed so as to be slightly inclined relative to a direction in which the window glass 5 moves up, namely, in such a manner that an exterior side thereof lies slightly further upwards.

A cushion material 50, which is formed of a sponge material and which has a substantially oval cross section, is adhered in advance to an outer surface of the bottom wall 40 by virtue of adhesion or welding. Due to this, when the glass run 10 is mounted in the door frame 2, a substantially triangular space is formed between the bottom wall 40 of the glass run 10 and the door frame 2. The cushion material 50 is fitted in the space so formed, and the bottom wall interior connection portion 46 and the cushion material 50 are brought into contact with the door frame 2 before the window glass 5 enters the glass run 10.

Since the side end of the bottom wall exterior connection portion 45 is bent to continue to the root portion of the exterior side wall 20, a large substantially triangular space can be provided between the bottom wall 40 and the door frame 2, and hence the thickness of the cushion material 50 that is mounted therein can be increased, thereby making it possible to enhance the impact absorbing capability to absorb impact produced by the window glass 5. In addition, when the upper end of the window glass 5 presses against the bottom wall 40, the bottom wall external portion 45 is made to deflect to facilitate the upward movement of the bottom central portion 44, this facilitating the deflection of the thick cushion material 50.

Since the bottom wall interior connection portion 46 and the cushion material 50 are mounted so as to be brought into contact with the door frame 2, when the upper end of the window glass 5 is brought into contact with the bottom wall 40, the upper end of the window glass 5 is allowed to move until the bottom wall interior connection portion 45 comes into contact with the door frame 2 while compressing the cushion material 50 with the bottom wall interior connection portion 46 acting as a fulcrum, whereby impact produced by virtue of the collision of the window glass 5 can be absorbed. In addition, since the bottom wall exterior connection portion 45 and the cushion material 50 are in contact with the door frame 2, the glass run 10 is held stably, whereby there occurs no case where the glass run 10 deviates within the door frame 2 when the window glass 5 collides against the glass run 10.

A bottom wall seal lip 42 is provided on an external surface of the bottom wall exterior connection portion 45 so as to extend toward the door frame 2. When the upper end of the window glass 5 is brought into contact with the bottom wall 40, the bottom wall seal lip 42 can be brought into contact with the door frame 2. When the upper of the window glass 5 presses against the bottom wall 40 to deflect the bottom wall 40 upward, the bottom wall seal lip 42 is caused to deflect to thereby absorb impact, and the sealing capability between the bottom wall 40 of the glass run 10 and the bottom wall portion of the door frame 2 can be enhanced.

Note that a surface of the bottom wall exterior connection portion 45 which oppositely faces the exterior side wall 20 is formed substantially flat, so as to be brought into tight contact therewith. Due to this, as shown in FIGS. 1, 2, when the upper end of the window glass 5 enters the inside of the glass run 10 to press against the bottom wall central portion 44, the flat surface of the bottom wall exterior connection portion 45 presses against the inner surface of the exterior side wall 20, whereby the exterior side wall 20 can be prevented from falling down into the inside of the substantially U-shaped cross section of the glass run 10.

Similar to the bottom wall exterior connection portion 45, the bottom wall interior connection portion 46 is also formed in such a manner that one of side ends thereof is continuous to a root portion of the interior side wall 30. In addition, a surface of the bottom wall interior connection portion 46 which oppositely faces the interior side wall 30 is similarly formed substantially flat. Additionally, a distal end of an inner surface of the bottom wall interior connection portion 46 has the bottom wall projection 41 which protrudes along an inner surface of the interior side wall 30. Due to this, the bottom wall projection 41 can support the interior side wall 30, whereby the interior side wall 30 can be prevented from falling down into an inside of the substantially U-shaped cross section of the glass run 10.

Next, a method for producing the glass run 10 will be described.

In extrusion molding of the glass run 10, solid materials are used for materials when forming extruded portions 11 and molding corner portions 12, and synthetic rubber, thermoplastic elastomer and a soft synthetic resin are used. For example, EPDM rubber is used as the synthetic rubber, olefin based elastomer as the thermoplastic elastomer, and soft vinyl chloride as the soft synthetic resin.

When forming the extruded portion 11, the extruded portion 11 is extruded using an extruding machine, and thereafter, the extruded portion so extruded is cut into portions of predetermined dimensions.

In the event of synthetic rubber, the extruded portion is transferred to a vulcanization device after extruding, where hot air or radio frequency vulcanization is carried. In the event of thermoplastic elastomer and soft synthetic resin, the extruded portion is not vulcanized but is cooled to set.

After extrusion and vulcanization, a low-degree slide assisting material is applied or bonded to surfaces of the exterior seal lip 20, the interior seal lip 30 and the bottom wall 40.

Next, when molding a molded portion which makes up a corner portion 12, end portions of extruded portions which are cut into predetermined dimensions are held in a mold for molding the molded portion, and a solid material forming the molded portion is injected into a cavity of the mold. The shape of cross section of the molded portion is substantially similar to that of the extruded portion. The same material as that used for the extruded portion is preferably used. In the event of thermoplastic elastomer and soft synthetic resin, since a material to be injected is fused when it is so injected, the extruded portions and a portion to be molded are integrally fusion bonded by virtue of head and pressure provided by the fused material.

In the event of synthetic rubber, the material is injected into the mold and thereafter, the mold is heated for vulcanization. As this occurs, since a portion to be molded can be vulcanized and bonded to the extruded portions using the same material or materials of similar types, they are adhered to each other integrally. In addition, in the event that the extruded portions are formed from synthetic rubber, the molded portion can be molded from thermoplastic elastomer.

What is claimed is:

1. A combination of a glass run and an inner part of a door frame of a vehicle door to guide a window glass when the window glass moves up and down, the combination comprising:
    an exterior side wall, an interior side wall and a bottom wall, wherein the bottom wall is mounted to the door frame such that the bottom wall is inclined with respect to an inner surface of the door frame of the glass run, and the exterior side wall, the interior side wall and the bottom wall form a substantially U-shaped cross section;
    an exterior seal lip and an interior seal lip of the glass run that are provided at distal portions of the exterior side wall and the interior side wall respectively, extending toward an inside of the U-shaped cross section, so that the exterior seal lip and the interior seal lip seal an exterior surface and an interior surface of an end portion of the door window glass respectively; and
    a cushion material provided on a back face of the bottom wall,
    wherein the bottom wall is configured so that an interior side end of the bottom wall, which is continuous with the interior side wall, is brought into contact with the inner surface of the door frame, and an exterior side end of the bottom wall, which is continuous with the exterior side wall, is spaced apart from the inner surface of the door frame when the glass run is mounted in the door frame,
    wherein the inclination of the back face of the bottom wall with respect to the inner surface of the door frame is such that a tapered space is formed between the back face of the bottom wall and the inner surface of the door frame,
    wherein the tapered space extends substantially from the interior side end of the bottom wall to the exterior side end of the bottom wall and widens in the direction of the external side wall,
    wherein a part of the back face of the bottom wall and a part of the cushion material are brought into contact with the inner surface of the door frame,
    wherein an unoccupied space is formed between the cushioning material and the door frame when the window glass is not brought into pressure contact with the bottom wall,
    when an upper end of the window glass is brought into pressure contact with the bottom wall, the bottom wall is deformed and displaced around the interior side end thereof as a fulcrum such that the exterior side end of the bottom wall is brought into contact with the door frame, and
    when the window glass is pressed against the bottom wall, the unoccupied space is reduced in size by the movement of the exterior end of the bottom wall toward the door frame.

2. A combination according to claim 1, wherein an inner surface of the bottom wall of the glass run is oriented substantially perpendicular to a direction in which the window glass moves up and down in a state the bottom wall is mounted in the door frame,
    the interior seal lip is formed longer than the exterior seal lip, and
    when the window glass is brought into pressure contact with the bottom wall, an exterior side end of the bottom wall which is continuous to the exterior side wall is formed so as to be brought into contact with the door frame.

3. A combination according to claim 1, wherein the bottom wall of the glass run has a central portion, and an exterior connection portion and an interior connection portion which are integrally formed with the central portion at opposite ends thereof, and the exterior connection portion is curved so as to be continuous to a root portion of the exterior side wall, and
    when the upper end of the window glass is brought into pressure contact with the bottom wall, a bottom wall seal lip is formed on an external surface of the exterior connection portion so as to be brought into contact with the door frame.

4. A combination according to claim 1, wherein the bottom wall has a central portion, and an exterior connection portion and an interior connection portion which are integrally formed with the central portion at opposite ends thereof, and
    a projection is formed on an inner surface of the interior connection portion of the bottom wall that is brought into contact with an inner surface of the interior side wall when the glass run is mounted in the door frame.

5. A combination according to claim 1, wherein a sub-lip is provided on an inner surface of the interior side wall.

6. A combination according to claim 1, wherein the cushion material is adhered to the back face of the bottom wall.

7. A combination according to claim 1, wherein the cushion material is formed of a sponge material.

* * * * *